Sept. 3, 1946.   E. S. THOMPSON   2,406,866
DISK HARROW
Filed March 21, 1944   2 Sheets-Sheet 1

Ernest S. Thompson, INVENTOR
BY Victor J. Evans & Co.
ATTORNEYS

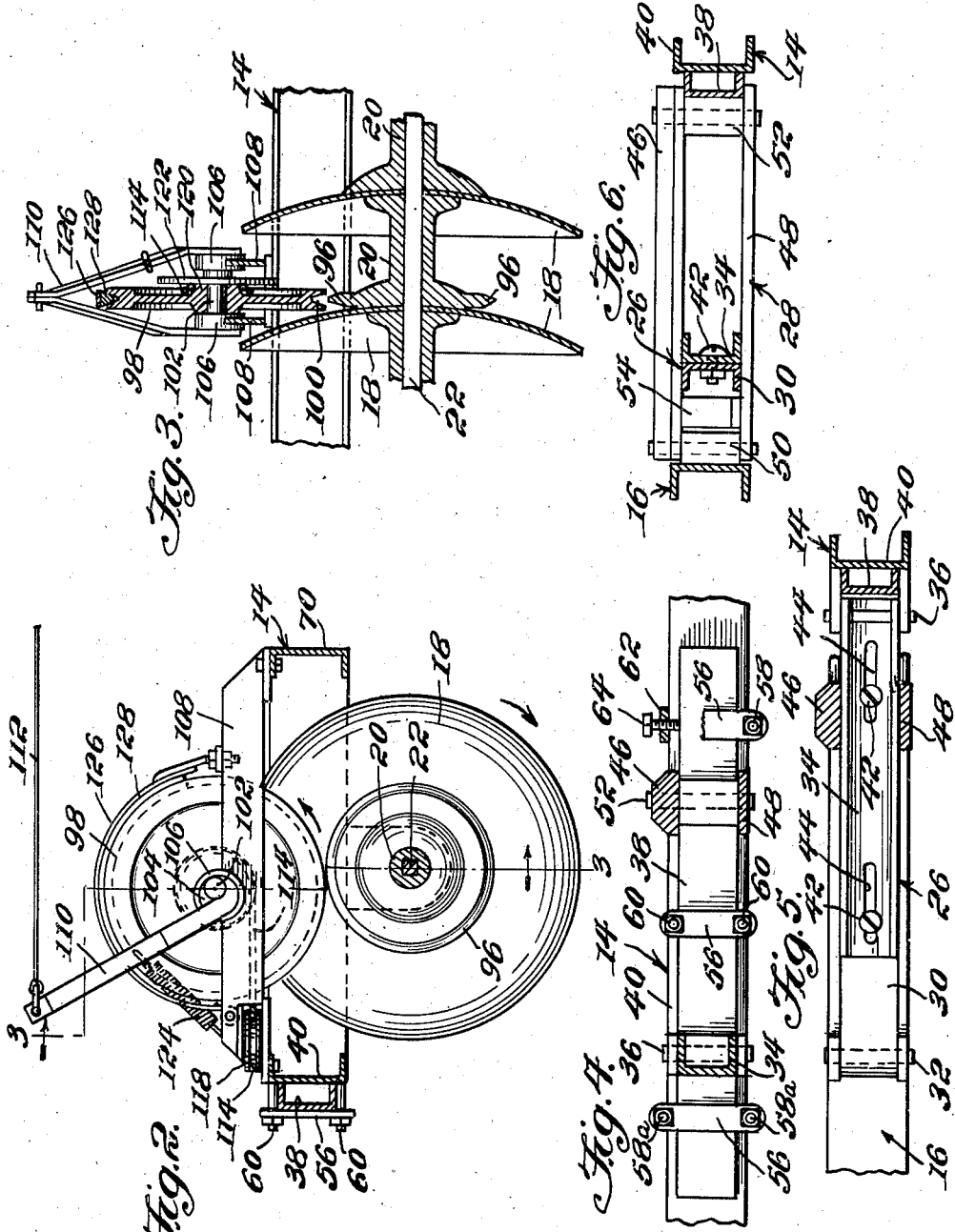

Patented Sept. 3, 1946

2,406,866

UNITED STATES PATENT OFFICE 2,406,866

DISK HARROW

Ernest S. Thompson, Stockton, Calif.

Application March 21, 1944, Serial No. 527,428

8 Claims. (Cl. 55—83)

My invention relates to agricultural implements and has among its objects and advantages the provision of an improved disk harrow of the tandem type, wherein novel means are incorporated for easily and quickly adjusting the disk units to different relative angular relationships as well as laterally with respect to each other without changing the spacing between the units, and in which the construction is such as to facilitate adjustment of essential parts without the necessity of removing bolts and the like.

In the accompanying drawings:

Figure 2 is a vertical sectional view through one of the disk units.

Figure 3 is a sectional view along the line 3—3 of Figure 2.

Figure 4 is a sectional view along the line 4—4 of Figure 1.

Figure 5 is a sectional view along the line 5—5 of Figure 1, and

Figure 6 is a sectional view along the line 6—6 of Figure 1.

Figure 1:
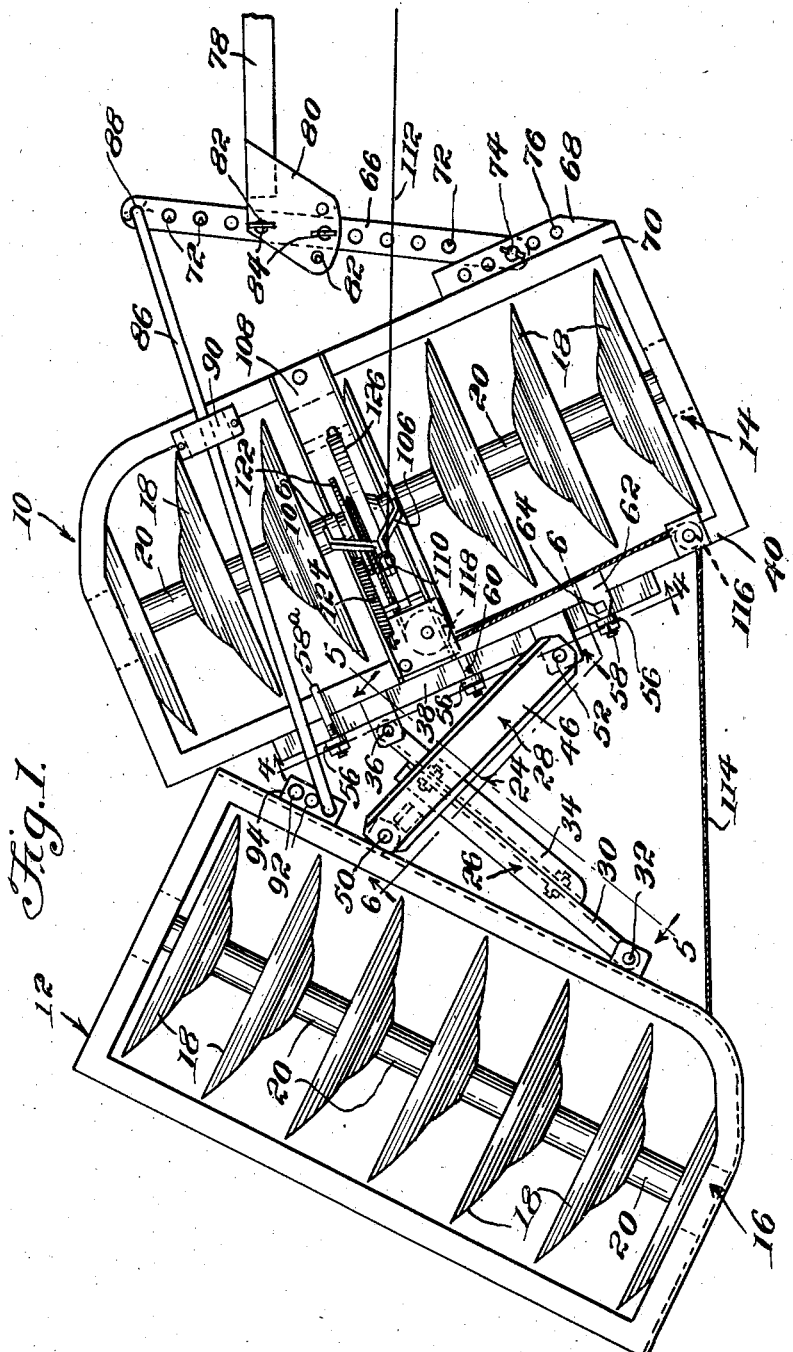
Figure 1 is a plan view of the invention.

In the embodiment of the invention selected for illustration, I make use of front and rear disk harrow units 10 and 12. These units comprise frames 14 and 16, respectively, each supporting disk soil cultivating tools 18, with the tools 18 in one unit reversed with respect to the tools in the other unit. The tools 18 in each unit are operatively connected by the usual spools 20 mounted on a square shaft, as at 22 in Figure 3. Such mountings are old and well known in the art. Suffice it to say that the disk tools are mounted for rotation on their respective frames. The shaft may, of course, be rounded.

The two units 10 and 12 are tied together by a cross coupling 24 comprising bars 26 and 28 having their ends pivotally connected with the respective frames 14 and 16. The bar 26 comprises a channel 30 having one end pivotally connected at 32 with the frame 16 and a channel 34 pivotally connected at 36 with a beam 38 clamped to the rear member 40 of the frame 14. The two channels 30 and 34 are adjustably connected together by bolts 42, see Figure 5, extending through openings in one channel and through slots 44 in the other channel, so that the bar 26 may be adjusted for length.

The bar 28 comprises members 46 and 48 each pivotally connected at 50 with the frame 16 and at 52 with the beam 38. The two members 46 and 48 are fixedly connected together in predetermined spaced relationship by a spacer 54 which is welded to both members, see Figure 6.

The bar 26 extends through the bar 28, the members 46 and 48 being spaced sufficiently far apart to freely accommodate the bar 26 therebetween without objectionable vertical play.

The beam 38 is somewhat narrower vertically than the member 40, see Figures 4, 5 and 6, and is clamped to the member 40 by straps 56 extending transversely of the beam and mounted on bolts 58, 58a and 60. The bolt 58 is welded to the upper and lower faces of the member 40 so as to be spaced apart a distance greater than the vertical width of the beam 38. The U-bolt 58a straddles the member 40 and is adjustable longitudinally thereof so that, in some settings of the beam 38, it may be arranged to clear the drawbar link 86. The bolts 60 are also welded to the member 40, but to its vertical face, so as to lie closely to the beam 38, the fit being such as to permit some pivotal movement of the beam 38 on one or both bolts 60 as a horizontal fulcrum and relatively to the member 40.

One of the bolts 58 includes a strap portion 62 in which is threaded a set screw 64 engageable with the beam 38 adjacent one end thereof. While the bars 26 and 28 pivot freely about vertical axes, the pivotal connections between these bars and the respective frames 14 and 16 is such as to substantially eliminate all pivotal movement of the bars about horizontal axes. Thus the frame 16 may be accurately adjusted with respect to the frame 14, as when arranging the two frames in a common plane, or when adjusting the two frames relatively to each other and about horizontal axes, if such adjustment is desired. The clearance between the beam 38 and the two sets of bolts 58 is sufficient to permit all necessary pivotal adjustment of the beam 38, and the set screw 64 functions as a stop which facilitates pivotal adjustment of the beam.

Lateral adjustment of the frames 14 and 16 may be made by adjusting the beam 38 longitudinally of the member 40. Such adjustment is made by loosening the straps 56 and then shifting the beam 38 the desired distance relatively to the member 40. In mounting the beam 38 on the member 40, this member comprising the rear structure of the frame 14, adjustment of the beam 38 longitudinally of the member 40 does not alter the spacing between the frames 14 and 16.

A strap 66 is pivotally connected at one end with a channel bar 68 welded to the front member 70 of the frame 14. The strap 66 is provided with openings 72 throughout its length, and a pivot pin 74 is selectively receivable in openings 76 in the flange 68 and one opening in the strap 66 to pivotally connect the latter with the flange. By reason of its form, the bar 68 provides a stiff support for the pin 74.

A draw bar 78 is provided with upper and lower flanges 80 which embrace the strap 66 and which are provided with openings 82 for selective reception of pins 84 which pass through selected openings 72 in the strap 66 to adjustably connect the draw bar with the strap. Thus the draw bar 78 may be shifted to different positions longitudinally of the strap 66, as well as connected therewith in different angular positions.

A draw link 86 is provided for the frame 16, which link has one end pivotally connected at 88 with the end of the strap 66 remote from the pin 74. The link 86 extends loosely through a guide 90 and has its other end shaped for selective reception in openings 92 in a flange 94 welded to the frame 16.

The strap 66 and the link 86 are connected with the tow ends of the frames 14 and 16, respectively, so that when a pull is exerted on the draw bar 78, the frames 14 and 16 move to the angular positions of Figure 1, with one corner of the frame 16 lying in engagement with the member 40. A rearward thrust on the draw bar 78 imparts movement to the frames 14 and 16 toward parallel relationship, or beyond.

Means are provided for easily and quickly changing the angular relationship between the frames 14 and 16 while the implement is in operation. This means comprises an annular and V-shaped flange 96 on one of the spools 20, see Figures 2 and 3. This flange is coaxial with the spool. Located above the flange 96 and in the plane thereof is a wheel 98 provided with a V-groove 100 contoured in accordance with the flange 96 so that the flange and the wheel may be frictionally connected by lowering the wheel 98.

The wheel 98 is rotatably mounted on a shaft 102, which shaft is provided with eccentrics 104 fixed thereto and rotatably mounted in bearings 106 mounted on a frame 108 attached to the frame 14. A lever 110 is secured to the eccentrics 104 for connection with a control line 112 which may be manipulated from a position on the tractor to which the implement is attached. Figures 2 and 3 illustrate the wheel 98 as being lifted from the flange 96, but the wheel may be moved into driving engagement with the flange 96 by exerting a pull on the line 112, which pivots the eccentrics 104 clockwise and lowers the shaft 102 sufficiently far to bring the wheel 98 into engagement with the flange 96.

A line 114 is attached at one end to the frame 16 and passes around a grooved guide wheel 116 mounted on the member 40 and then around a guide wheel 118 mounted on the frame 108. From the wheel 118, the line 114 passes underneath the hub 120 of the wheel 98 to be wound thereon. A flange 122 is attached to the wheel 98 and coacts with the wheel and the hub to provide a spool on which the line 114 may be wound.

To adjust the units 10 and 12 to different relative angular positions from those shown in Figure 1, a pull is exerted on the line 112 to bring the wheel 98 in engagement with the flange 96. As the flange 96 is fixed to its carrying spool 20, the flange is rotated with the spools and the disks for imparting rotation to the wheel 98. Such rotation of the wheel 98 winds the line 114 on the spool and brings the two units 10 and 12 toward a more parallel relationship. This adjustment is easily controlled through mere manipulation of the line 112, since the wheel 98 is rotated only when in driving engagement with the flange 96. The two units 10 and 12 may be brought into any desired angular relationship by controlling the driving period of engagement between the wheel 98 and the flange 96.

A tension spring 124 is connected with the lever 110 and the frame 108 to normally hold the lever in the position of Figure 2. When in this position, the wheel 98 is positively restrained from rotation through the medium of a brake band 126 having its ends attached to the frame 108 and extending substantially 180 degrees about the wheel 98. This band is provided with a V-shaped brake lining 128 which lies in the plane of the wheel 98 and is receivable in the groove 100 as the wheel 98 is brought to its normal position of Figure 2. The wheel 98 is restrained from rotation in a sufficient degree to be capable of holding the units 10 and 12 in different angular positions.

When the line 112 is released, the spring 124 jerks the lever 110 back to bring the wheel 98 into braking engagement with the lining 128 as soon as the pull line 112 is released. The line 114 may be released by imparting a slight pivotal movement to the lever 110 from its position of Figure 2. This brings the wheel 98 out of holding engagement with the lining 128 so that the resistance effective on the rear unit 12 will exert a sufficient pull on the line 114 to increase the angle between the units 10 and 12.

Without further elaboration, the foregoing will so fully explain my invention, that others may, by applying current knowledge, readily adapt the same for use under various conditions of service.

I claim:

1. A disk harrow comprising a front frame and a rear frame each having a rotative soil cultivating disk means, crossed bars pivotally connected with said frames, a draw bar means pivotally connected with one end of the front frame and with the other end of the rear frame to swing the frames to a predetermined angular position, and means actuated by cultivating movement of one of said rotative soil cultivating disk means for moving said frames to different angular positions.

2. A disk harrow comprising a front frame and a rear frame each having a rotative soil cultivating disk means, crossed bars pivotally connecting said frames, a draw bar means pivotally connected with one end of the front frame and with the other end of the rear frame to swing the frames to a predetermined angular position, means actuated by cultivating movement of one of said rotative soil cultivating disk means for moving said frames to different angular positions, and means mounted on said front frame in contact with said third mentioned means for normally maintaining said third mentioned means inoperative and restraining said frames from movement with respect to angular displacement.

3. The invention described in claim 1 wherein one of said crossed bars is provided with spaced members and in which the other bar extends loosely between said members for relative movement in a horizontal plane but restrained from relative vertical movement.

4. The invention described in claim 1 wherein means are provided for attaching said crossed bars to said front frame for adjustment laterally of the front frame.

5. The invention described in claim 1 wherein a beam is mounted on said front frame for adjustment about a horizontal axis, and in which said crossed bars are connected with said beam.

6. The invention described in claim 1 wherein a beam is mounted on said front frame for adjustment about a horizontal axis, and in which said crossed bars are connected with said beam, said beam being adjustable laterally of said front frame.

7. The invention described in claim 2 wherein said third mentioned means comprise a spool rotatably mounted on said front frame, a line having one end attached to said spool and its other end attached to the rear frame, a friction drive fixedly related to the rotative soil cultivating disk means of the front frame for rotation therewith, and means mounted on said friction drive for moving said spool into frictional driving engagement with said friction drive.

8. The invention described in claim 2 wherein said third mentioned means comprise an annular drive member fixed to the rotative soil cultivating disk means of the front frame, a rotative wheel having a spool means fixed thereto, a line having one end attached to said spool means and its other end attached to the rear frame, eccentric means mounted on said wheel for moving said wheel into and out of driving engagement with said annular drive member, and a brake means for said wheel mounted on said front frame above said wheel to restrain the latter from rotation.

ERNEST S. THOMPSON.